(12) United States Patent
Lee et al.

(10) Patent No.: US 11,432,381 B1
(45) Date of Patent: Aug. 30, 2022

(54) PHOTOSENSOR DEVICE

(71) Applicant: Luxsentek Microelectronics Corp., New Taipei (TW)

(72) Inventors: Sheng-Cheng Lee, New Taipei (TW); Wen-Sheng Lin, New Taipei (TW); Chih-Wei Lin, New Taipei (TW); Chen-Hua Hsi, New Taipei (TW)

(73) Assignee: LUXSENTEK MICROELECTRONICS CORP., New Taipei (TW)

( * ) Notice: Subject to any disclaimer, the term of this patent is extended or adjusted under 35 U.S.C. 154(b) by 0 days.

(21) Appl. No.: 17/483,173

(22) Filed: Sep. 23, 2021

(30) Foreign Application Priority Data

Jun. 2, 2021 (TW) ................................. 110119992

(51) Int. Cl.
| | |
|---|---|
| *H05B 45/18* | (2020.01) |
| *H05B 45/12* | (2020.01) |
| *H05B 45/14* | (2020.01) |
| *H05B 45/32* | (2020.01) |
| *H05B 47/16* | (2020.01) |

(52) U.S. Cl.
CPC .................................. *H05B 45/18* (2020.01)

(58) Field of Classification Search
CPC ........ H05B 45/18; H05B 45/12; H05B 45/14; H05B 45/32; H05B 47/16
See application file for complete search history.

(56) References Cited

U.S. PATENT DOCUMENTS

| | | | |
|---|---|---|---|
| 2014/0231625 A1* | 8/2014 | Chang | H04N 21/4318 250/206 |
| 2016/0353560 A1* | 12/2016 | Bortolotti | H04W 4/023 |

* cited by examiner

*Primary Examiner* — Daniel D Chang
(74) *Attorney, Agent, or Firm* — Muncy, Geissler, Olds & Lowe, P.C.

(57) ABSTRACT

The present invention provides a photosensor device with temperature compensation, which can adjust or calibrate the number, time and power of luminescence of light emitting elements under different ambient temperatures, so that the light signal values received by the photosensor device can be kept consistent or within the error range, there are multiple applications.

10 Claims, 4 Drawing Sheets

PHOTOSENSOR DEVICE

BACKGROUND OF THE INVENTION

1. Field of the Invention

The present invention generally relates to a photosensor device, and particularly to the photosensor device with temperature compensation.

2. Description of the Prior Art

A photosensor irradiates light through an emitting element, usually infrared ray, on an object, reflected by the object, and received by a sensing element. The sensing element converts the reflection light into an electrical signal. A control unit interprets the electrical signal to have a specific sensing function, such as to determine the distance of the object. Usually, the emitting element is implemented by a LED or a vertical cavity surface emitting laser (VCSEL), and the sensing element by a photodiode.

At a fixed power, the emitting element decays when the environment temperature increases, as shown as FIG. 1 for the VCSEL. It means the intensity of the reflection light decreases when the temperature increase, and the decay will impact the accuracy of the interpretation result at higher temperature. This phenomenon is called temperature drift.

The present invention provides a calibration scheme for solving the problem of temperature drift.

SUMMARY OF THE INVENTION

The present invention proposes a solution to avoid or reduce the temperature drift of a light emitting element to enhance the detection accuracy.

A photosensor device, comprising:
a control module;
a one-cycle-clock ADC connected to the control module;
a light emitting module, comprising a light emitting element and a driver, the driver is coupled between the light-emitting element and the control module, wherein the driver receives a light control signal from the control module to drive the light emitting element to emit a detection light;
a thermal tracking table unit connected with control module, and the thermal tracking table unit is configured to store a temperature/power table of the light-emitting element;
a temperature sensing unit connected to the one-cycle-clock ADC through a first switch unit, and the temperature sensing unit is configured to sense and convert an ambient temperature to a temperature sensing signal;
a light receiving module configured to receive a reflection light of the detection light from the object and to generate a light sensing signal; and
an analog front-end module coupled between the light receiving module and the one-cycle-clock ADC, and the analog front-end module is configured to receive and convert the light sensing signal to a light analog signal; wherein
the one-cycle-clock ADC is configured to receive and convert the light analog signal and the temperature sensing signal to a light digital signal and a temperature digital signal, and output the light digital signal and the temperature digital signal to the control module; and the control module connects to the first switch unit for switching the first switch unit to close or open.

DESCRIPTION OF THE PREFERRED EMBODIMENTS

Below embodiments accompanied with drawings are used to explain the spirit of this invention to have better understanding for the person in this art, not used to limit the scope of this invention, which is defined by the claims. The applicant emphasizes the element quantity and size are schematic only. Moreover, some parts might be omitted to skeletally represent this invention for conciseness.

The present invention proposes a solution, a compensation mechanism, to decrease the impact of the temperature drift. An amplification circuit is used to calibrate the driving power of the emitting element, LED or VCSEL, according to its temperature drift characteristic.

The photosensor device comprises a thermal tracking table unit and a temperature sensing unit. The temperature sensing unit measures an ambient temperature, and the control unit can get the calibration value of the ambient temperature from the thermal tracking table unit. As a result, the reflection intensity received by the sensing element can be kept within the allowance error range to extend the sensing temperature range.

The control unit of the photosensor device switches the device into the calibration mode or the operation mode. In the calibration mode, the device gets the temperature-calibrated power of the light emitting unit or the temperature-calibrated value for the gain of the light sensing element. In the operation mode, the device sets calibrated power to drive the light emitting element or uses calibrated value to adjust the gain of the electrical signal sensed by the light sensing element. In this paper, the power calibration of the emitting element is used.

At the time to turn on the photosensor device or after a time interval, the photosensor switches on the calibration mode first and then to the operation mode. The calibration time must be extremely short and cannot be felt by the user or to affect the sensor's operation. At the time of entering the calibration mode, if the difference between the real-time temperature and that of the operation mode is lower than a threshold, the sensor does not re-calibrate, but quickly returns to the operation mode to avoid unnecessary calibration loops.

A switch unit between the temperature sensing unit and the one cycle click base analog-to-digital converter is controlled by the control unit. When the switch is closed, the photosensor device switches into the calibration mode, measures the ambient temperature, and reads the calibration value of the power of the light emitting element or the gain value of the electrical signal of the light sensing element. When the switch is open, the photosensor device enters the operation mode, calibrates the driving power of the light emitting element or the gain value of the electrical signal of the light sensing element. This time division multiplexing processing method is quick and reduces the power consumption.

Figure 1:
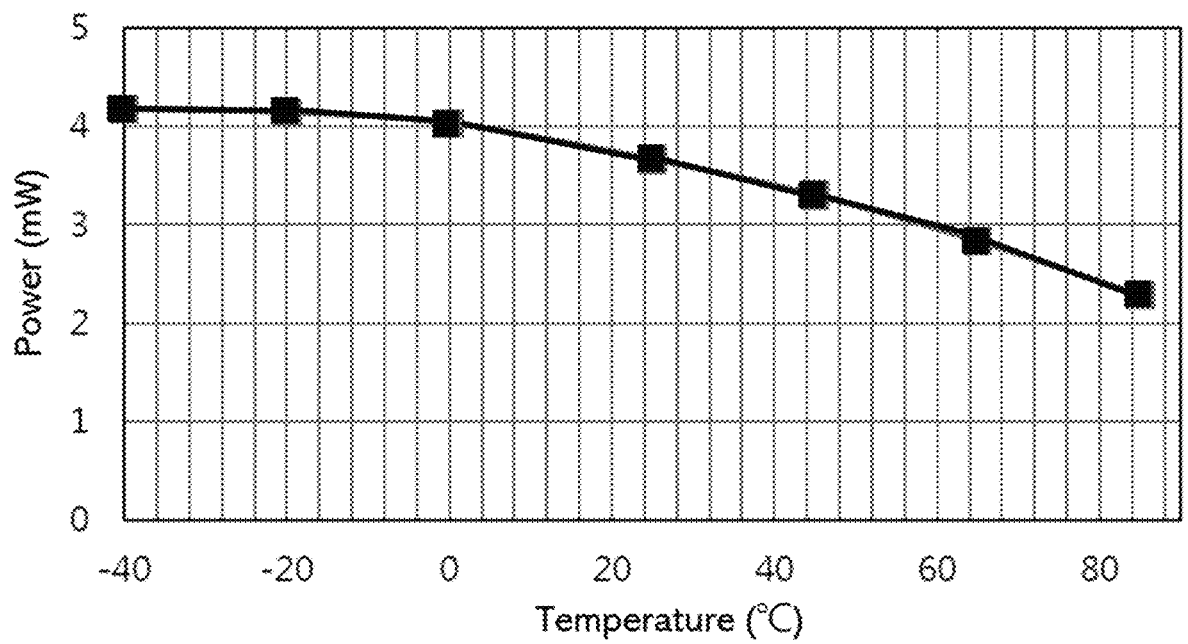
FIG. 1 shows a temperature drift curve for a VCSEL, the power of the emitted intensity decays when the temperature increases.
Figure 2:
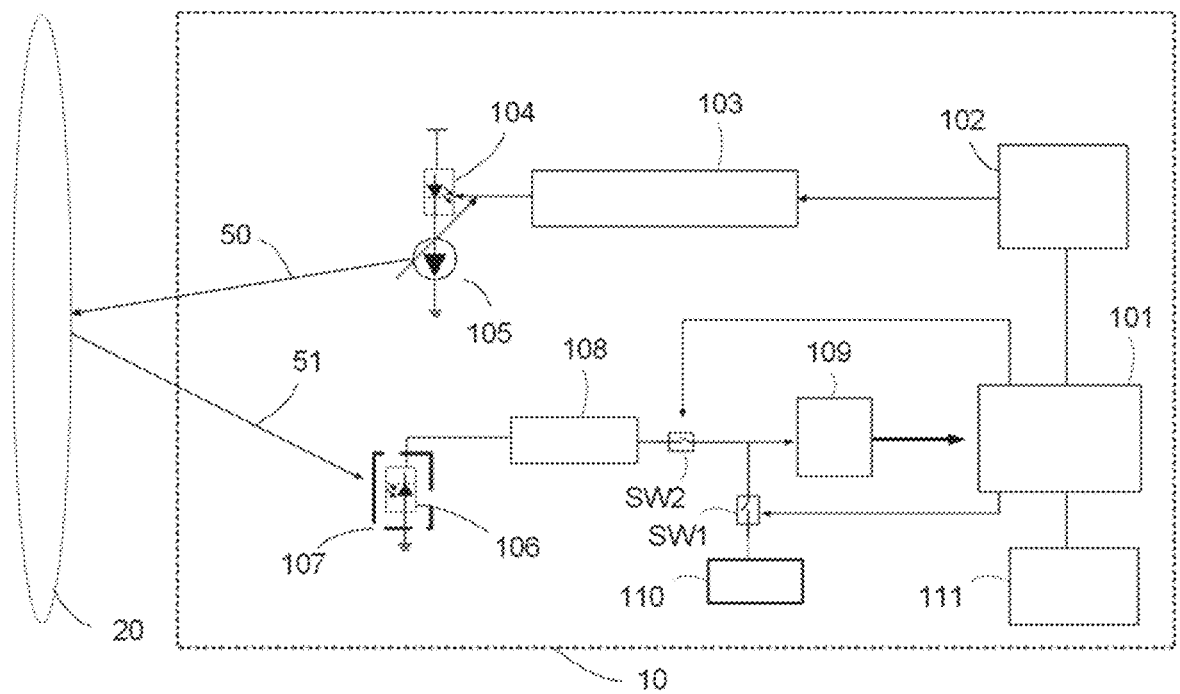
FIG. 2 is a schematic diagram to show the basic architecture of a photosensor device.

FIG. 2, a schematic diagram, shows the basic architecture of a photosensor device. The photosensor device 10 comprises a control module, a light emitting module, a thermal tracking table unit 111 connected to the control module, a light receiving module 106, an analog front-end module 108, a one-cycle-clock ADC 109, a temperature sensing unit 110, a first switch unit (SW1) set between the temperature sensing unit 110 and the one-cycle-clock ADC 109, and a second switch unit (SW2) set between the analog front-end module 108 and the one-cycle-clock ADC 109.

In this embodiment, the photosensor reads the current ambient temperature and then according to the temperature to adjust driving power of the light emitting element (VCSEL) through the driver 104 by setting the pulse count, the pulse width and/or the pulse intensity.

The light emitting module comprises the light emitting element 105 and the diver 104. The light emitting element 105 is driven by the driver 104, which it receives a light control signal from the control module. As a result, the control module can control the intensity of the detection light 50. In this embodiment, the light emitting element 105 used is a VCSEL. It can be another type of light emitting element, like a LED.

The temperature sensing unit 110 senses the ambient temperature converts into a temperature sensing signal. The one-cycle-clock ADC 109 converts the temperature sensing signal to a temperature digital signal and outputs to the control module.

The light receiving module 106 receives a reflection light 51 of the detection light 50 from the object 20 and converts into a light sensing signal, the analog front-end module 108 converts the light sensing signal to a light analog signal, the one-cycle-clock ADC converts the light analog signal to a light digital signal and output to the control module. In other embodiments, the filter 107 can be optionally arranged around the light receiving module 106 to avoid light crosstalk or interference caused by different colors.

The control module comprises a microcontroller 101 which used to obtain and store a reference value corresponding to the temperature digital signal from a temperature/power table of a thermal tracking table unit 111. The reference value could be, for example, a signal representing a calibration driving power of the light emitting element. The digital signal processing unit 102 converts the reference value to a timing control signal, and a timing controller 103 converts the timing control signal to the light control signal. The light control signal could be a sequential pulse signal, which can have different pulse count, pulse width, pulse intensity (pulse height) and those control the driving power of the light emitting element (LED).

The control module can switch the SW1 and the SW2 to close or open. When the SW1 is switched to close and the SW2 is switched to open, the photosensor device enters a calibration mode. In calibration mode, the photosensor device measures the temperature, and at the mean while the light emitting module, the light receiving module 106, and the analog front-end module 108 stop operating to save energy. When the SW1 is switched to open and the SW2 is switched to close, the photosensor device enters an operation mode, and the temperature sensing unit 110 stops operating.

An internal memory is built-in or equipped on the microcontroller 101 to store reference values (i.e., to implement the thermal tracking table unit 111 or noted as finite-state machine (FSM)). The internal memory can be a one-time programming ROM or a flash memory.

Figure 3:
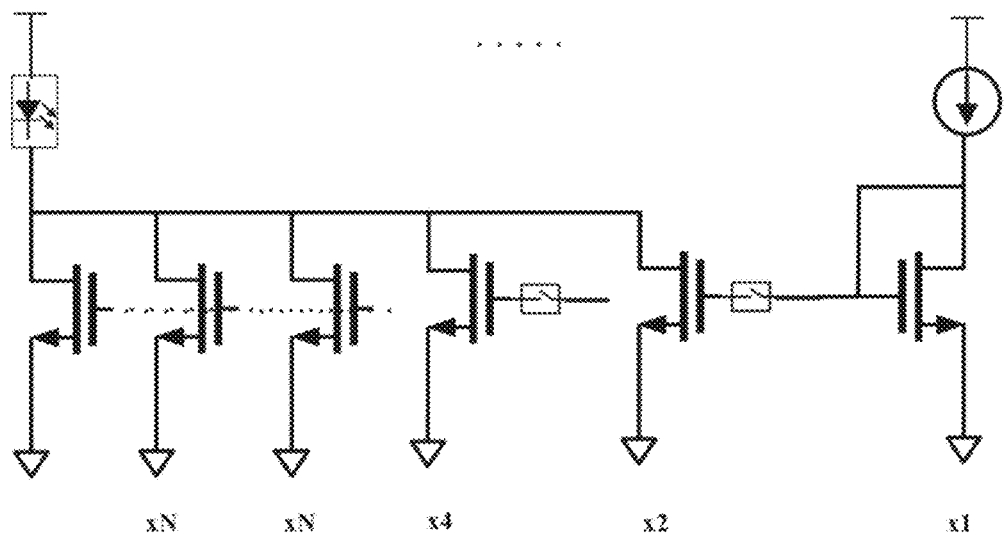
FIG. 3 is a schematic diagram to show the driver circuit of the emitting element of a photosensor device.

FIG. 3, a schematic diagram, shows the driving circuit of the light emitting element. In this embodiment, a plurality of light emitting elements is used and each is connected to a driver through a switch unit (SW). The control module can turn on one or more light emitting elements to control the detection light intensity. For example, a VCSEL is a single light emitting element or multiple sub-emitting elements, which can be adjusted as required. The driving power of every multiple sub-emitting elements can be varied, in general the greater power for the farer object.

Figure 4:
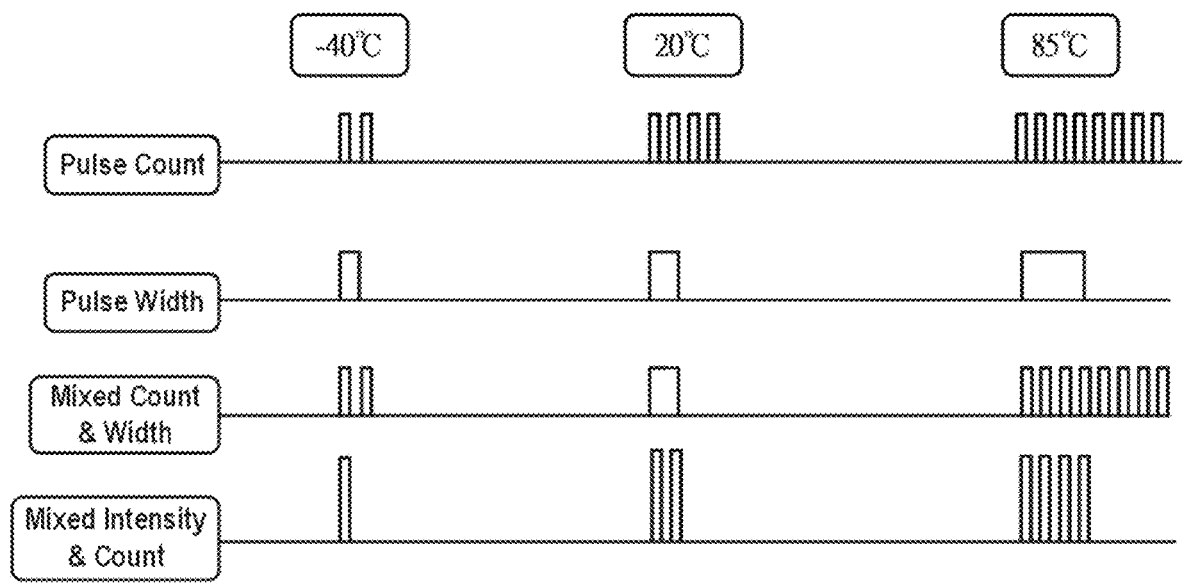
FIG. 4 shows the temperature compensation various mechanisms to adjust the power of the emitting element.

FIG. 4 shows the calibrations in an embodiment at different temperatures, for example at −40° C., 20° C. and 85° C. The embodiment, shown as the drawing, controls driving power by pulse count. The sequential pulse has fewer pulse count at lower temperature and more at higher. The second embodiment, controls driving power by pulse with, that has narrower width at low temperature and wider pulse at high. The third embodiment, controls driving power by pulse count and pulse width. The fourth embodiment, controls the driving power by pulse intensity (pulse height), that is lower intensity at low temperature and higher intensity at higher. The specific pulse count, pulse width and height depend on the characteristic curve of the temperature draft for the specific light emitting element.

Figure 5:
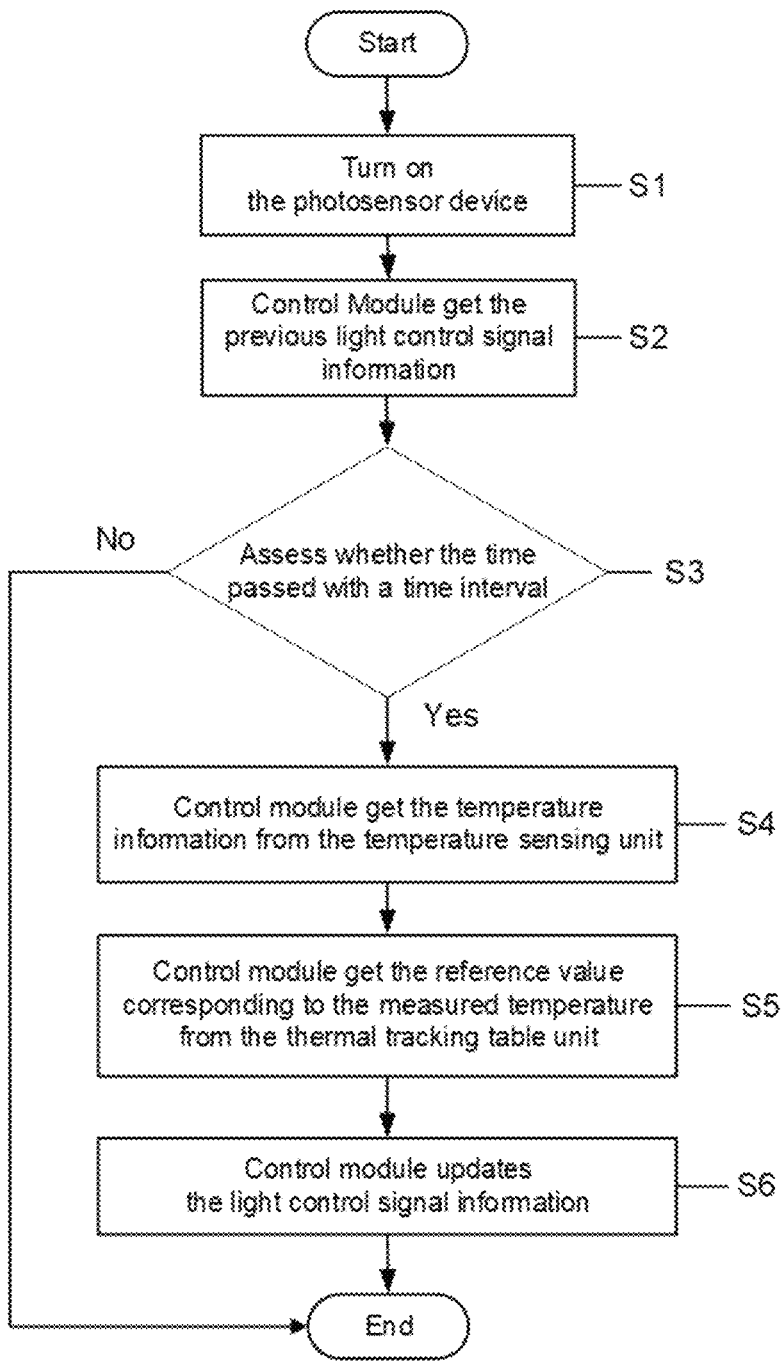
FIG. 5 is a calibration flow chart of the photosensor device.

FIG. 5 shows the flow chart to calibrate the photosensor device. When the photosensor device turns on (step S1), the microcontroller can read the previous light control signal from the internal memory (finite-state machine, FSM) (step S2). Then the photosensor device checks whether the time interval is longer than a period (step S3), such as 8 to 15 seconds. The photosensor device switches into the calibration mode to renew the calibration reference value if yes; or stay in operation mode if not.

In the calibration mode, the microcontroller obtains the ambient temperature information through the temperature sensing unit (step S4), then retrieves the reference value corresponding to the ambient temperature from the thermal tracking table unit (step S5). The microcontroller uses the new reference value to reset driving power of the light emitting element by adjusting the pulse count, pulse width or pulse intensity (step S6) to complete the calibration and enters the operation mode.

In one embodiments, after measuring the ambient temperature information (step S4), the photosensor device check the difference between the ambient temperature and the operation temperature whether exceed the a threshold, such as 1 to 10° C. The photosensor device switches into the calibration mode if yes; or returns into the operation mode if not. The threshold is determined according to the requirements. For example, the threshold is 5% for general purpose, but must be less than 1% for specialized industrial requirement.

Figure 6:
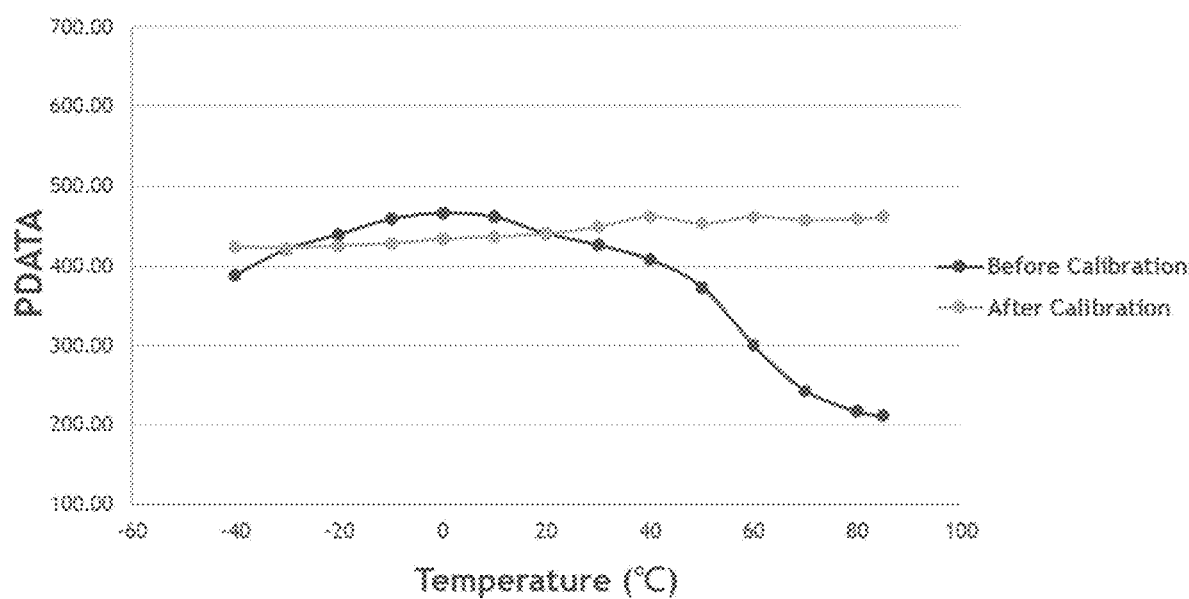
FIG. 6 shows the curves of sensed signal for non-calibrated and calibrated cases.

FIG. 6, shows the effect of the calibration. The overall error (decay magnitude) of the temperature drift may be more than double before calibration. The overall error can be controlled within 5% after the calibration according to the present invention.

What is claimed is:

1. A photosensor device, comprising:
    a control module;
    a one-cycle-clock ADC connected to the control module;
    a light emitting module, comprising a light emitting element and a driver, the driver is coupled between the light-emitting element and the control module, wherein the driver receives a light control signal from the control module to drive the light emitting element to emit a detection light;
    a thermal tracking table unit connected with control module, and the thermal tracking table unit is configured to store a temperature/power table of the light-emitting element;
    a temperature sensing unit connected to the one-cycle-clock ADC through a first switch unit, and the temperature sensing unit is configured to sense and convert an ambient temperature to a temperature sensing signal;
    a light receiving module configured to receive a reflection light of the detection light from the object and to generate a light sensing signal; and
    an analog front-end module coupled between the light receiving module and the one-cycle-clock ADC, and the analog front-end module is configured to receive and convert the light sensing signal to a light analog signal; wherein
    the one-cycle-clock ADC is configured to receive and convert the light analog signal and the temperature sensing signal to a light digital signal and a temperature digital signal, and output the light digital signal and the temperature digital signal to the control module; and
    the control module connects to the first switch unit for switching the first switch unit to close or open.

2. The photosensor device according to claim 1, wherein the control module comprises:
    a microcontroller is configured to obtain and store a reference value corresponding to the temperature digital signal from the temperature/power table;
    a digital signal processing unit connects to the microcontroller, and the digital signal processing unit is configured to receive and convert the reference value into a timing control signal; and
    a timing controller couples between the digital signal processing unit and the driver, and the timing controller is configured to receive and convert the timing control signal to the light control signal.

3. The photosensor device according to claim 2, wherein the microcontroller comprises an internal memory to store the reference value.

4. The photosensor device according to claim 1, wherein the light control signal comprises a pulse count, a pulse width, and a pulse intensity.

5. The photosensor device according to claim 4, wherein the pulse count, the pulse width and/or the pulse intensity multiple increase(s) when the ambient temperature exceeds a threshold.

6. The photosensor device according to claim 1, further comprising a second switch unit coupled between the analog front-end module and the one-cycle-clock ADC, wherein the control module connects to the second switch unit for switching the second switch unit to close or open.

7. The photosensor device according to claim 1, wherein the control module switches the first switch unit to close according to a time interval, the photosensor device enters a calibration mode, and the control module switches the first switch unit to open, the photosensor device enters an operation mode.

8. The photosensor device according to claim 7, wherein the time interval is 8 to 15 seconds.

9. The photosensor device according to claim 1, wherein the control module switches the first switch unit to close according to a temperature difference, the photosensor device enters a calibration mode, and the control module switches the first switch unit to open, the photosensor device enters an operation mode.

10. The photosensor device according to claim 9, wherein the temperature difference ranges from 1 to 10° C.

* * * * *